(12) United States Patent
Aweya et al.

(10) Patent No.: US 6,549,517 B1
(45) Date of Patent: Apr. 15, 2003

(54) EXPLICIT RATE COMPUTATION FOR FLOW CONTROL IN COMPUTE NETWORKS

(75) Inventors: James Aweya, Nepean (CA); Michel Ouellette, Rockland (CA); Delfin Y. Montuno, Kanata (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/209,273

(22) Filed: Dec. 11, 1998

(51) Int. Cl.$^7$ ................................................ H04L 12/06
(52) U.S. Cl. ..................... 370/236.1; 370/232; 370/231
(58) Field of Search ................................. 370/234, 235, 370/230, 395, 357, 236–236.1, 231, 232

(56) References Cited

U.S. PATENT DOCUMENTS

| | | | | |
|---|---|---|---|---|
| 5,633,589 A | * | 5/1997 | Jain et al. | 370/234 |
| 5,675,576 A | * | 10/1997 | Kalampoukas et al. | 370/232 |
| 5,805,577 A | | 9/1998 | Jain et al. | 370/234 |
| 5,864,538 A | * | 1/1999 | Chong et al. | 370/236.1 |
| 5,991,268 A | * | 11/1999 | Awdeh et al. | 370/232 |
| 6,046,981 A | * | 4/2000 | Ramamurthy et al. | 370/232 |
| 6,377,550 B1 | * | 4/2002 | Prasad | 370/236.1 |
| 6,434,118 B1 | * | 8/2002 | Kirschenbaum | 370/236.1 |

OTHER PUBLICATIONS

A. F. Atlasis, E. D. Baltatzis, and G. I. Stassinopoulos, "The Use of the Fast Resource Management protocol in ATM Networks–Performance and Applicability", IEEE Computers and Communications, 1998, pp. 84–88.*

F.M. Chiussi, A. Arulambalam, Y. Xia, and X. Chen, "Explicit Rate ABR Schemes Using Traffic Load as Congestion Indicator", IEEE Computer Communications and Networks, 1997, pp. 76–84.*

H. H. Lim, and B. Qiu, "Performance Enhancement of ERICA+ Using Fuzzy Logic Prediction", IEEE Communications, 1999, Vo 1, pp. 134–138.*

Kim et al., "The ABR Congestion Control by the Least Squares Estimation of Spatial Distribution of Sources," 1$^{st}$ IEEE International Conference on ATM. ICATM'98, Proceedings of ICATM'98: IEEE International Conference on ATM, Colmar, France, Jun. 22–24, 1998, pp. 353–348.

ATM Forum Traffic Management Specification, Version 4.0, 1996 (TM4.0).

Kawahara et al., Characteristics of ABR Explicit Rate Control Algorithms in WAN Environments and an ABR Control Algorithm in WAN Environments and an ABR Control Algorithm Suitable for Public Network, Int'l. Journal of Comm. Systems, vol. 11, 1998, pp. 189–209.

(List continued on next page.)

Primary Examiner—Kwang Bin Yao
Assistant Examiner—Thai Hoang
(74) Attorney, Agent, or Firm—Finnegan, Henderson, Farabow, Garrett & Dunner, L.L.P.

(57) ABSTRACT

Flow control in a network is implemented based on aggregate traffic measurements. For example, in an ATM network only the aggregate background (CBR/VBR) traffic rate and the aggregate ABR traffic rate are used, in contrast with other schemes that require per-connection rate measurements or variables. An explicit rate is calculated recursively at discrete time instances using a scaled error value which is generated in response to an aggregate ABR input rate and a desired traffic rate. Explicit rate computations can be performed entirely by software, and the interval between computations is large enough to keep the processing overhead required of the switch very low. In addition, methods consistent with the present invention achieve max-min fairness and MCR plus equal share in a natural way without any additional computation or information about bottleneck rates.

15 Claims, 8 Drawing Sheets

OTHER PUBLICATIONS

Arulambalam et al., Allocating Fair Rates for Available Bit Rate Service in ATM Networks, IEEE Comm. Mag., Nov. 1996, pp. 92–100.

Benmohamed et al., Feedback control of congestion in packet switching networks: The case of a single congested node, IEEE/ACM Trans. Networking, vol. 1, No. 6, Dec. 1993, pp. 693–708.

Kolarov et al., A Control Theoretic Approach to the Design of Closed Loop Rate Based Flow Control for High Speed ATM Networks, IEEE INFOCOM'97, Kobe, Japan, Apr. 1997.

A.B. Bishop, Introduction to Discrete Linear Controls: Theory and Application, Academic Press, New York, 1975.

DiStefano et al., Feedback and Control Systems, Schaum's Outline Series, McGraw–Hill, New York, 1990.

* cited by examiner

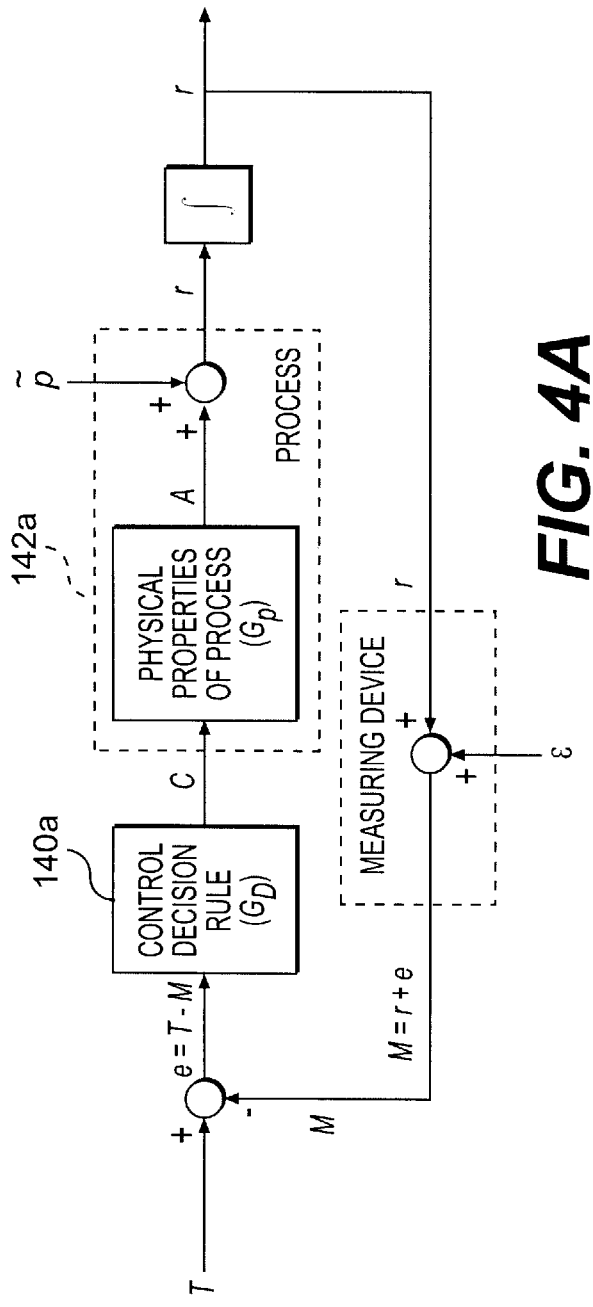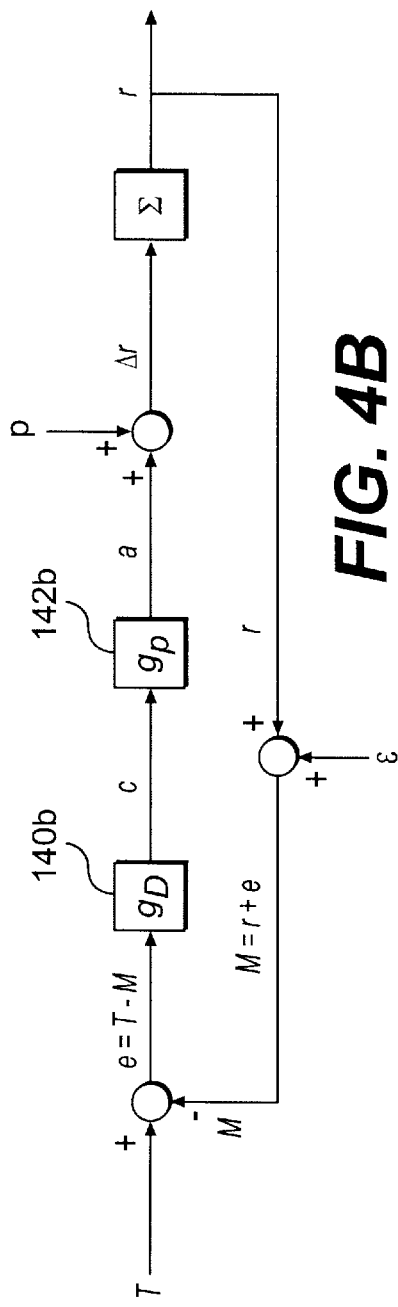
FIG. 4A
FIG. 4B

EXPLICIT RATE COMPUTATION FOR FLOW CONTROL IN COMPUTE NETWORKS

BACKGROUND OF THE INVENTION

The present invention relates to flow control in a communications network and, more particularly, to an Explicit Rate (ER) computation for Available Bit Rate (ABR) traffic to achieve flow control in an Asynchronous Transfer Mode (ATM) network.

The *ATM Forum Traffic Management Specification*, Version 4.0, 1996 (TM4.0), specifies five classes of service to support the diverse requirements of multimedia traffic: Constant Bit Rate (CBR), Real-Time Variable Bit Rate (rt-VBR), Non-Real-Time Variable Bit Rate (nrt-VBR), Available Bit Rate (ABR), and Unspecified Bit Rate (UBR). The UBR traffic class provides a best-effort service: No amount of bandwidth is guaranteed, and any cells may be discarded. ABR and UBR are best suited for LAN internetworking and other types of data traffic. UBR is directed at delay-tolerant applications (e.g., file transfer and e-mail). It provides no feedback about network congestion to the user or application. Thus, UBR increases the risk of discarded cells, which in turn increases network traffic because of the lost cells that must be retransmitted.

The ATM Forum defined ABR service to improve service to bursty sources that would instead use UBR. ABR is intended for data applications that can adapt to time-varying bandwidth and tolerate unpredictable end-to-end cell delays. ABR connections share the available bandwidth. The concept of available bandwidth is intrinsic to the service; it is whatever bandwidth exists in excess of CBR/VBR traffic, as defined by the network provider. Thus, the ABR traffic is allowed to use bandwidth that would otherwise be unused, increasing the link utilization without affecting the quality of service (QoS) of CBR/VBR connections. The main practical difference between ABR and UBR is that for ABR, the network provides congestion information to the application. This lets the application constantly modify the transmission rate, achieving the best throughput.

The ABR service class is designed so that applications can grab any unused network resources that VBR and CBR traffic does not utilize, i.e., unused bandwidth and buffer space. Gains due to statistical resource utilization, however, come at the risk of potential congestion when many applications compete for network resources. Therefore, proper congestion control must be in place to ensure that network resources can be shared in a fair manner and that performance objectives such as cell loss ratio can be maintained. In TM4.0, the ATM Forum has specified a flow control mechanism which supports several types of feedback to control the source rate in response to changing transfer characteristics. The purpose of feedback in the context of ABR service is to use available bandwidth (after allocation to CBR and VBR sources) efficiently and allocate it evenly among active ABR connections. Other objectives include instantaneous access to bandwidth which is required to offer dynamic ABR service. This feedback information is conveyed to the source, which adapts its traffic in accordance with the feedback. The feedback information includes the state of congestion and a fair share of the available bandwidth according to a network-specific allocation policy. To ensure interoperability, an ABR end system must always implement the standard-defined source and destination behavior in TM4.0.

The ABR congestion control scheme specified in TM4.0 is a rate-based, closed-loop control that utilizes the feedback information from the network to regulate the rate of cell transmission at the source. FIG. 1 illustrates the basic operation of ABR congestion control. In network 100, source 102 transmits data cells 108 to destination 104 via one or more switches in network 100, one of which, switch 106, is shown in FIG. 1. Source 102 also generates special probe cells 110 referred to as forward resource management (RM) cells in proportion to its current data cell rate. The parameter Nrm specifies the maximum number of cells a source may send for each forward RM cell. Thus, source 102 normally sends a forward RM cell 110 for every Nrm-1 data cells 108. Destination 104 turns around and sends RM cells 110 back to source 102 in the other direction. These cells are referred to as backward RM cells, and are shown as cells 112 in FIG. 1.

The RM cells, which can be examined and modified by the switches in both forward and backward directions, carry feedback information of the state of congestion and the fair rate allocation. TM4.0, which is incorporated herein by reference, presents a precise definition of the source end system and destination end system behavior, the content and format of RM cells, and a range of feasible switch mechanisms. These mechanisms are characterized by different levels of complexity and achieve varying degrees of fairness. The wide range of options demonstrates the flexibility in the choice of switch mechanisms available with the rate-based framework. With reference to FIG. 1, the following summarizes the operation of the rate-based control scheme, the details of which are found in TM4.0.

A switch shall implement at least one of the following methods to control congestion:

a) Explicit Forward Congestion Indication (EFCI) marking: Switch 106 may set the EFCI condition in the header of an ATM data cell 108 (using the payload type field) as it passes in the forward direction. This causes destination end system 104 to set the congestion indication (CI) bit in a backward RM (BRM) cell 112. Most first-generation ATM switches implemented this mechanism before the RM cell was fully defined.

b) Relative rate marking: Switch 106 may set the CI or the no increase (NI) bit of a passing forward RM cell 110 or backward RM cell 112. If the bit is set in a forward RM (FRM) cell 110, that bit will remain set in the corresponding BRM cell 112. More rapid results are achieved by setting one of these bits in a passing BRM cell 112. To achieve the most rapid result, a switch may generate a BRM cell 112 with the CI or NI bit set rather than wait for a passing BRM cell.

c) Explicit rate marking: Switch 106 may reduce the value of the explicit rate (ER) field of an FRM cell 110 and/or BRM cell 112.

Switches that implement the first two options above are known as binary switches; they can reduce implementation complexity but may result in unfairness, congestion oscillation, and slow response. Switches that implement the last option are generally called ER switches and require sophisticated mechanisms at the switches to compute a fair share of the bandwidth. The standard-defined source and destination behaviors, however, allow interoperation of the above three options.

With reference to FIG. 1, source end system 102 sets up a connection with a call setup request for ABR connection. During this signaling setup, values for a set of ABR-specific parameters are signaled by source end system 102 and the network elements. Some of these parameters are requested by source 102, based on its requirements, and can subsequently be modified by the network (e.g., Peak Cell Rate (PCR), Minimum Cell Rate (MCR)), while others can be set by the network (e.g., those impacting rate increase/decrease behavior such as Rate Increase Factor (RIF), Rate Decrease Factor (RDF), and Nrm). An application using ABR service specifies a Peak Cell Rate (PCR) that it will use and a Minimum Cell Rate (MCR) that it requires. The network allocates resources so that all ABR applications receive at least their MCR capacity. The network then shares any unused capacity in a fair and controlled fashion among all ABR sources. Any capacity that ABR sources do not use remains available for UBR traffic.

Once source 102 has received permission, it begins scheduling cells for transmission at the allowed cell rate (ACR). The ACR is initially set to the initial cell rate (ICR) and is always bounded by the MCR and the PCR. Transmission of data cells 108 is preceded by transmission of a forward RM cell 110. Source 102 continues to send forward RM cells 110, typically after every (Nrm-1) data cells 108. Source 102 places the ACR value in the current cell rate (CCR) field of forward RM cell 110, and the rate at which it wishes to transmit cells (usually the PCR value) in the ER field of forward RM cell 110. Forward RM cells 110 traverse forward through the network, and destination 104 turns RM cells 110 around in the backward direction so that they become backward RM cells 112. Intermediate switches on the path notify source 102 of congestion by marking the EFCI bit in data cells 108 and the CI or NI bit of a forward RM cell 110 or backward RM cell 112, and/or reducing the ER value in forward RM cells 110 or backward RM cells 112. Switches capable of only EFCI marking ignore the content of RM cells.

Upon return of backward RM cell 112, source 102 should adapt its ACR to the information carried in the RM cell. Feedback from the network appears periodically as a sequence of backward RM cells 112. If CI is not set, source 102 may linearly increase its ACR by a fixed increment (RIF*PCR). This increase can reach the ER value in backward RM cell 112, but should never exceed the PCR. If CI is set, source 102 must exponentially decrease its ACR by an amount greater than or equal to a proportion of its current ACR, (RDF*ACR). The factors RIF and RDF control the rate at which the source increases and decreases its rate, respectively. If the ACR is still greater than the returned ER, source 102 must further decrease its ACR to the returned ER value, although it should never be below the MCR. If NI is set, source 102 should observe the CI and ER fields in the RM cell, but it is not allowed to increase the ACR above its current value. To make the ABR framework robust to synchronized surges in traffic from different users and to network failures, source 102 also decreases its ACR if it is not taking full advantage of the rate or receiving the expected return flow of RM cells 112.

When forward RM cell 110 arrives at destination 104, destination 104 changes the direction (DIR) bit in the cell and returns it to source 102. If destination 104 is congested and cannot support the rate in the ER field, destination 104 reduces the ER to whatever rate it can support. When returning an RM cell, if destination 104 observes that the EFCI bit is set in the last received data cell 108, it sets the CI bit in a backward RM cell 112 to indicate congestion. If destination 104 experiences congestion, it may also set the CI or NI bit when converting an FRM cell to a BRM cell.

The first generation of ATM switches to support ABR used the EFCI, NI, and CI bits, providing a simple relative-rate control mechanism based on binary feedback information. The inherent shortcomings of the binary approach have recently led to the consideration and implementation of a second generation of ABR service, which uses sophisticated fair rate allocation algorithms that compute fair rates for each connection and convey this information to the sources as an explicit rate. Under this newer approach, a network switch is responsible for allocating the fair share of the bandwidth among all connections that compete at this switch point. Since this allocation policy is implementation-specific, it has been at the center of switch design and implementation. This issue has become an important differentiating factor for the next generation of commercially available switches.

A number of ABR rate control algorithms have been proposed. Kawahara, R., H. Saito, and M. Kawarasaki, "Characteristics of ABR Explicit Rate Control Algorithms in WAN Environments and an ABR Control Algorithm Suitable for Public Networks," Int'l. Journal of Comm. Systems, vol. 11, 1998, pp. 189–209, and Arulambalam, A., X. Chen and N. Ansari, "Allocating Fair Rates for Available Bit Rate Service in ATM Networks," IEEE Comm. Mag., November 1996, pp. 92–100, summarize existing and proposed fair rate allocation schemes and present their relative merits and detailed performance characteristics. Most existing and proposed rate control schemes are not entirely satisfactory for implementation in public Wide Area Networks (WANs), which have long round-trip times and a great number of multiplexed connections. It is generally very difficult for a rate control scheme to be efficient, fair, and practical to implement at the same time. The effectiveness of any feedback control scheme is limited by the latency of the feedback loop. In particular, when connections traverse several intermediate nodes, extreme unfairness can result. Connections whose feedback delays are smaller and thus have up-to-date rate information can have an unfair advantage over connections that have larger feedback delays. In a WAN, the latency of the feedback loop, coupled with the fact that the amount of buffer space at each node can be less than the bandwidth delay product of the route, can lead to significant degradation in network performance.

A main drawback of most proposed explicit rate control algorithms proposed is that they are based on heuristics and depend on a number of tuning parameters, which must be set correctly, and also on a number of measurements that are costly and difficult to perform. Further, these proposals do not provide any formal design methodology to ensure the stability of the control loop. Two exceptions are the algorithms proposed in Benmohamed, L., and S. M. Meerkov, "Feedback control of congestion in packet switching networks: The case of a single congested node," IEEE/ACM Trans. Networking, vol. 1, no. 6, December 1993, pp. 693–708, and Kolarov, A., and G. Ramamurthy, "A Control Theoretic Approach to the Design of Closed Loop Rate Based Flow Control for High Speed ATM Networks," IEEE INFOCOM'97, Kobe, Japan, April 1997, both of which provide control theoretic methods for the design of closed loop flow control schemes where the issues of stability and fairness are addressed. While these proposed methods are probably stable, they are difficult to implement, especially on a large scale.

It is desirable, therefore, to provide an explicit rate flow control scheme that is simple to implement and is fair to multiple sources. It is more desirable to provide such a scheme that also is scalable with speed, distance, number of users, and number of network nodes. It is even more desirable to provide such a scheme that has provably stable behavior and converges in steady state.

SUMMARY OF THE INVENTION

This invention satisfies those desires by providing a simple, stable, scalable method for computing a fair share traffic rate in communication networks.

A method consistent with the present invention controls flow in a network at a network switch that receives data packets and management packets by measuring an aggregate arrival rate of data packets from a plurality of source-destination connections, determining an available capacity on the outgoing link from the switch for data packets based on the maximum capacity of the link, determining a fair share rate for data packets based on the aggregate arrival rate of the data packets, the available capacity of the outgoing link, and a maximum round-trip delay for management packets from source to destination and back to source, and determining a new target rate for the data packets on each of the plurality of connections based on the fair share rate. A method consistent with the present invention further replaces a target rate contained in management packets with the new target rate.

A method consistent with the present invention further measures an aggregate arrival rate of additional data packets of a different type from the data packets and bases the available capacity of the data packets on the aggregate arrival rate of the additional data packets. Further, a method consistent with the present invention determines a fair share rate on the relative weights of the plurality of connections.

Systems are also provided for carrying out the methods consistent with the present invention.

The advantages accruing to the present invention are numerous. Methods and systems consistent with the present invention are easy to implement without requiring a specific switch architecture. They determine an explicit rate allocation that is fair to all sources of ABR traffic. Methods and systems consistent with the present invention are also scalable and exhibit provably stable behavior. They are also robust with respect to system perturbations and bursty sources.

The above desires, other desires, features, and advantages of the present invention will be readily appreciated by one of ordinary skill in the art from the following detailed description of the preferred implementations when taken in connection with the accompanying drawings.

BRIEF DESCRIPTION OF THE DRAWINGS

FIGS. 4A–B illustrate feedback control systems in continuous time and discrete time, respectively;

DETAILED DESCRIPTION OF THE PREFERRED EMBODIMENTS

Methods of flow control consistent with the present invention are simple to implement because they use only two primary measurements: the aggregate background (CBR/VBR) traffic rate and the aggregate ABR traffic rate. In contrast with other schemes, methods consistent with the present invention do not require per-connection rate measurements or variables. Furthermore, methods consistent with the present invention compute an explicit rate at discrete time instances using a simple proportional controller model. Explicit rate computations can be performed entirely by software, and the interval between computations is large enough to keep the processing overhead required of the switch very low. In addition, methods consistent with the present invention achieve max-min fairness and MCR plus equal share, as defined in TM4.0, in a natural way without any additional computation or information about bottleneck rates.

Figure 1:
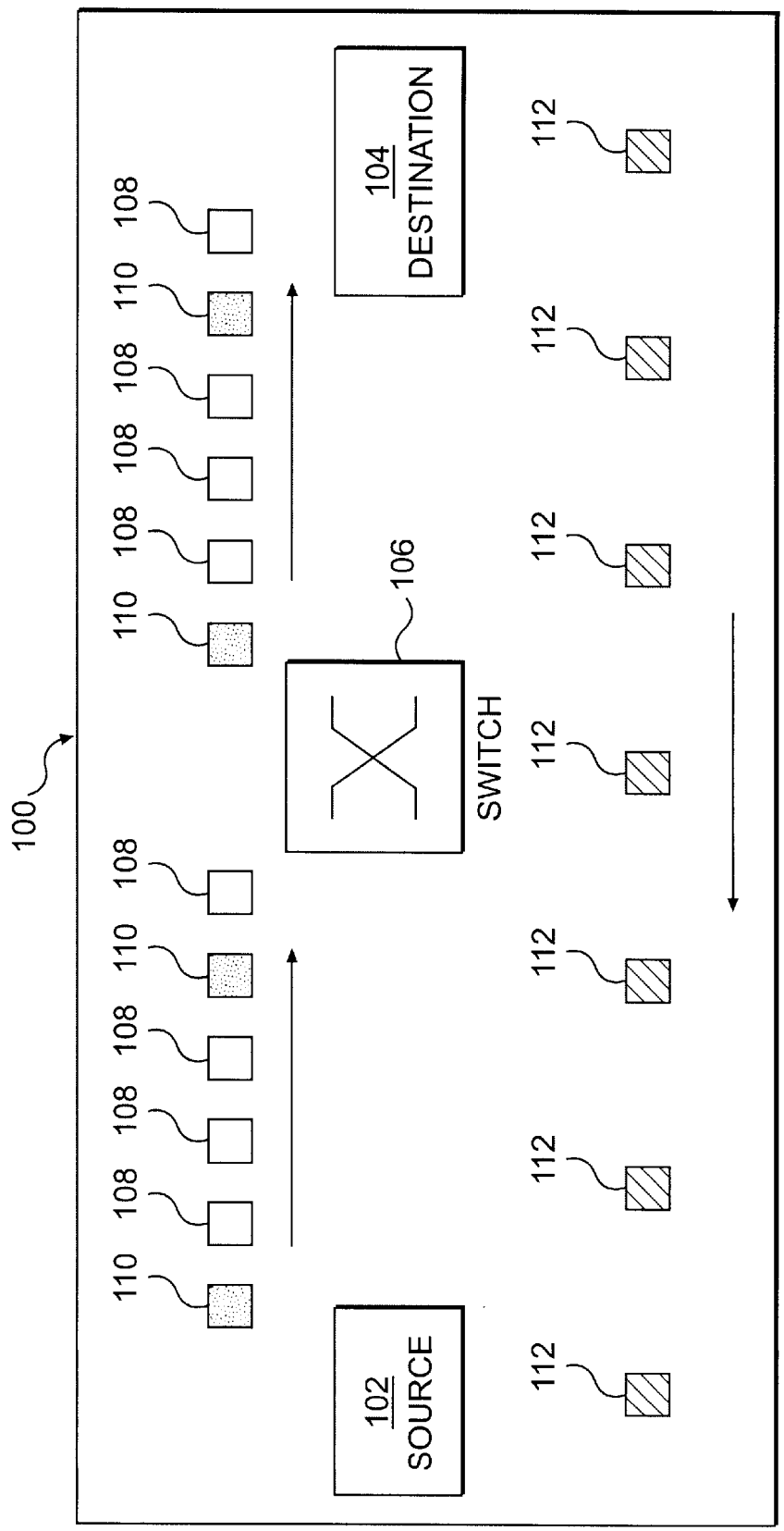
FIG. 1 is a diagram illustrating the basic operation of ABR congestion control.
Figure 2:
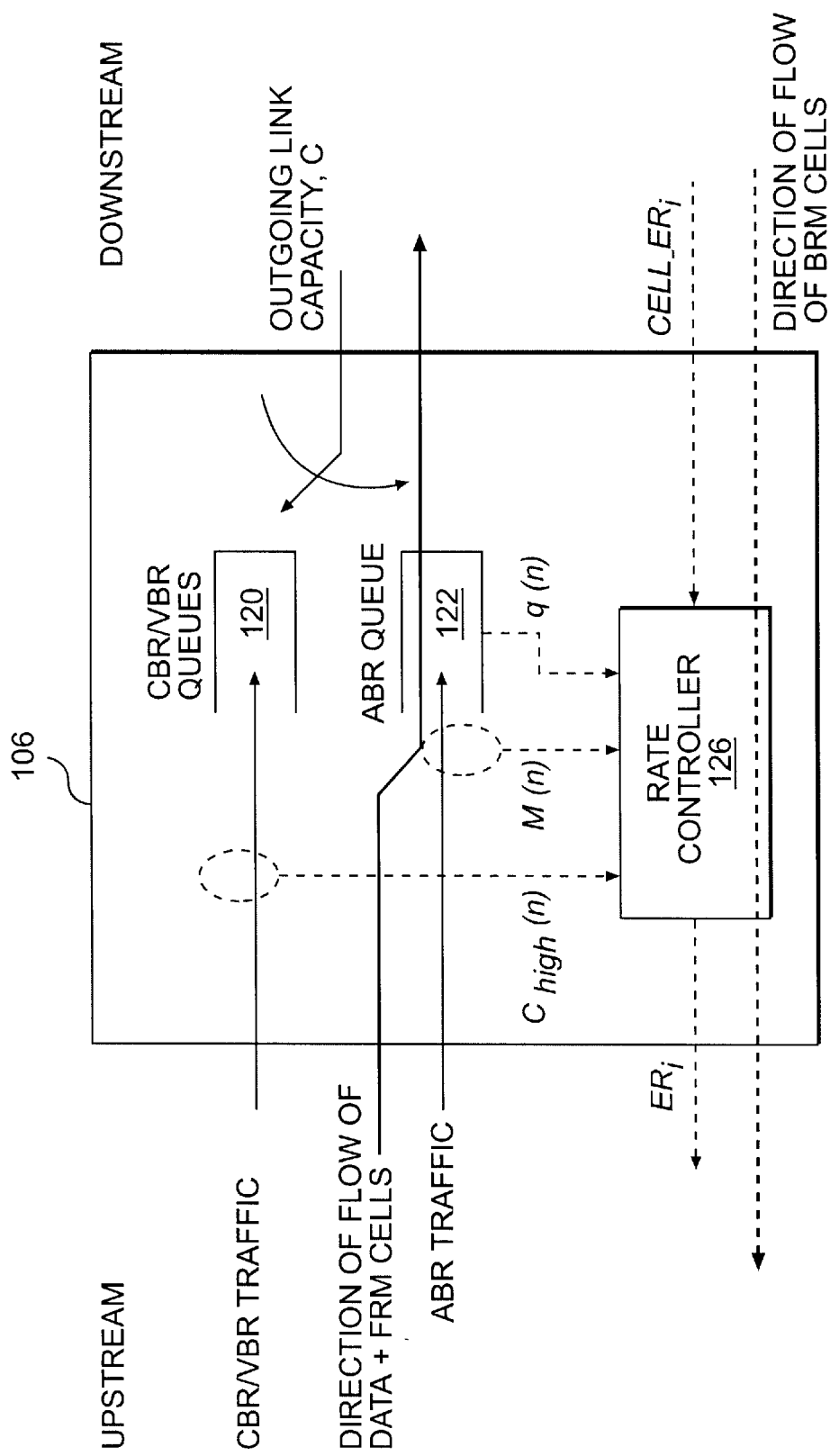
FIG. 2 is a high-level block diagram of a flow control system in a network switch consistent with the present invention.

FIG. 2 is a high-level block diagram illustrating a system for flow control consistent with the present invention. CBR/VBR traffic arrives at switch 106 from the upstream direction (i.e., from the direction of the source) and is queued in CBR/VBR queues (or buffers) 120. ABR traffic arrives at switch 106 from the upstream direction and is queued in ABR queue (or buffer) 122. Rate controller module 126 computes a new explicit rate, $ER_i$, for ABR connections originating at source i, and writes it into passing RM cells. The new rate is based on the outgoing link capacity, C, the current ER value, $Cell\_ER_i$, in an RM cell's ER field, and measurements of traffic arrivals and queue lengths at time n, e.g., $C_{high}(n)$ (a measurement of the CBR/VBR traffic arrival rate), M(n) (a measurement of the ABR traffic arrival rate), and q(n) (a measurement of the ABR queue length). FIG. 2 also shows the direction of flow of data cells 108 and FRM cells 110 (downstream flow) and BRM cells 112 (upstream flow). Consistent with the present invention, rate controller 126 can update the ER fields of either FRM cells or BRM cells. In order to achieve a faster system response, however, only BRM cells need to have their ER fields updated, as indicated in FIG. 2.

Figure 3:
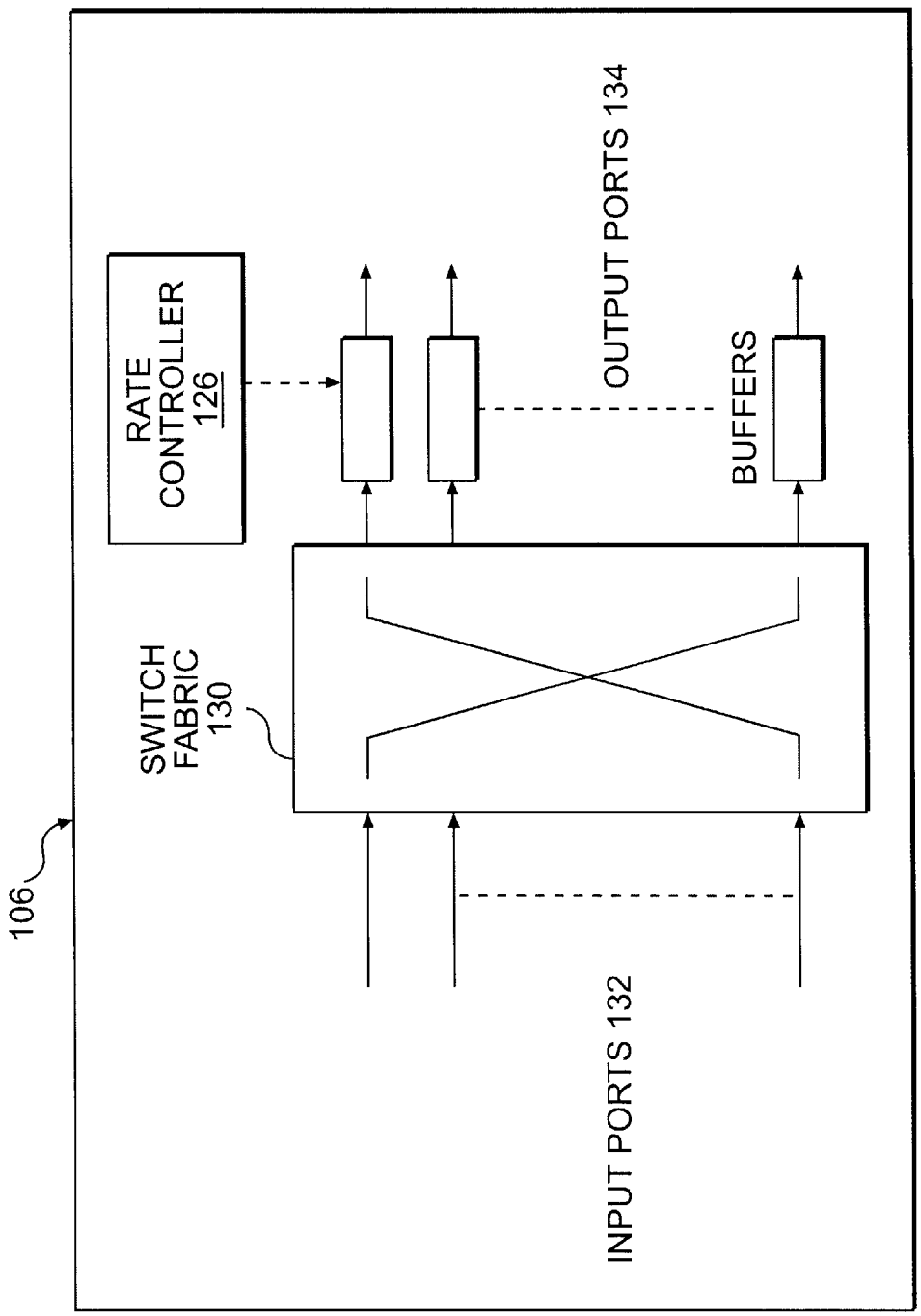
FIG. 3 illustrates a network switch consistent with the present invention.

FIG. 3 illustrates an example of switch 106, in which the switch is output buffered, to be used for exemplary purposes in presenting details of methods and systems of flow control consistent with the present invention. An output buffered switch includes switch fabric 130, input ports 132, and output ports 134, which include buffers. Since the cause of a bottleneck in an output buffered switch is due to limited capacity at an output port, methods of flow control consistent with the present invention will be explained with respect to a specific output port. Thus, rate controller 126 modifies the ER value of RM cells in the output port buffers. Methods consistent with the present invention may also operate in input buffered or input/output buffered switches, models for which are shown in Kolarov et al. The choice of switch architecture does not affect the structure of flow control methods consistent with the present invention.

Consistent with the present invention, rate controller 126 of switch 106 computes a fair rate allocation r (n) common to all ABR connections using a particular output port every $t_m$ seconds. Assuming a single common queue for ABR traffic at each output port (adaptation to per-connection queuing is straightforward), rate controller 126 computes the rate r (n) for each output port based on the number of cells arriving at this port. With this basic framework, rate controller 126 stamps successive RM cells of the same connection with the ER computed during a $t_m$ period.

Consistent with the present invention, the new explicit rate will reach the source after a delay $d_b$. Upon receipt of a backward RM cell, the source will change its transmission rate to the ER value computed at time $t-d_h$. The new rate is always bounded by the MCR and PCR. The effect of the source's adaptation to the new rate becomes apparent at the switch port after another delay $d_f$. For slotted time, with each slot of length $t_m$ seconds, the control output is computed at the end of each time slot. Thus, the time difference between consecutive control instants is $t_m$ seconds. The rate r (n+1) is stored during the next time slot [n+1, n+2 ) in a table accessible to all the backward RM cells flowing through an output port. For connections bottlenecked at the output port, the computed ER based on r (n+1) will be written as the new ER value in the payload of the backward RM cell. For the rest of the connections, which are bottlenecked at downstream nodes, the ER field is left unchanged.

Control System Model

Since sources adapt their transmission rate in response to feedback received via backward RM cells, flow control schemes consistent with the present invention can be modeled as feedback control systems. Bishop, A. B., *Introduction to Discrete Linear Controls: Theory and Application*, Academic Press, New York, 1975, which is herein incorporated by reference, provides a detailed discussion of feedback control systems. The following section presents a discussion of the elements of a basic feedback control system that will be used to model explicit rate flow control consistent with the present invention.

In a typical feedback control system, there is a system target to which the system is controlled. The system input is determined by a controller according to a control algorithm, which monitors the states inside the system, and compares them to the desired values, also referred to as the reference or target values. FIGS. 4A–B illustrate a generalized process control system in continuous time and discrete time, respectively. FIGS. 4A–B show control systems with both sampling and measurement errors. In both figures, the process output r is detected by the measuring device, which adds an error $\epsilon$ to the true value r because of sampling distributions, measurement inaccuracies, or both. The measured value M, available for comparison with the desired level of operation T, is thus the sum of the true value and the measurement error. The error signal e is given by $$e = T - M = T - r - \epsilon \quad (1)$$

Controller 140a (or 140b, in the discrete time representation of FIG. 4A) produces a control signal C (or c) that is a specified function $G_D$ (or $g_D$) of e and perhaps previous values of e if the controller is equipped with memory. The control signal C (or c) reacts with the physical properties of controlled process 142a (or 142b) to produce a controlled change A (or a) in the process output $G_p$ (or $g_p$) represents the functional relationship between A (or a) and C (or c). The output is also influenced by the effects of uncontrollable variables $\hat{P}$ (or p) (such as system disturbances). Since A (or a) is defined as an instantaneous adjustment and $\hat{P}$ (or p) as an instantaneous perturbation, each affects the rate of change of output $\dot{r}$ or ($\Delta r$). The actual output r is the integration (or sum) of these rates of changes over time.

Perturbations or "noise" are the result of environmental effects over which the control system itself has no direct control. The system can at best react to the presence of these effects either as they occur or are forecasted. Perturbations or noise are almost always present in control-system applications. For this reason, essentially all control systems have one or more feedback loops to permit the system to compensate for these anticipated perturbations. The presence of the feedback loop also permits automatic response to changes in input, an essential feature for a tracking device.

Referring now to the discrete time representation in FIG. 4B, a discrete control model can be developed for modeling a flow control system consistent with the present invention. If samples are equally spaced in time by the increment $t_m$, then the nth sampling period corresponds to the time t in the range $n \cdot t_m \leq t < (n+1) \cdot t_m$. The system difference equation is derived as follows. By definition, $$e(n) = T(n) - M(n) = T(n) - r(n) - \epsilon(n), \quad (2)$$

so that, using a simple proportional controller (with $g_D = \alpha$ as the proportionality constant), $$c(n) = \alpha e(n) = \alpha T(n) - \alpha r(n) - \alpha \epsilon(n). \quad (3)$$

In the very common situation in which the entire desired adjustment c (n) is effectively completed within the sampling period, $$c(n) = a(n), \quad (4)$$

i.e., $g_p$ is simply an identity function. Controllers for which equation (4) holds are sometimes referred to as "rapid-response controllers." In this situation, the simple proportional controller has a control decision rule with a unit-impulse response of $$g_D = \alpha \delta(n) \quad (5)$$

and the physical properties of the process are represented as $$g_p = \delta(n), \quad (6)$$

resulting in $$a(n) = c(n) = \alpha e(n) = \alpha[T(n) - r(n) - \epsilon(n)]. \quad (7)$$

The rapid-response feature will be assumed in the following description.

T(n) is the desired level of process output in effect when the nth sample is measured. For simplification in the following equations, T (n) is assumed to be a constant T, although a constant value does not necessarily apply in all cases. Since the adjustment in equation (3) is complete when the next interval (n+1) begins, and since the perturbations are additive, the difference between r (n+1) and r (n) must be the sum of a (n) and p (n). Thus, $$\Delta r = r(n+1) - r(n) = a(n) + p(n) \quad (8)$$

or $$r(n+1) = r(n) + a(n) + p(n) \quad (9)$$

Substitution of equation (3) into equation (8) and rearranging yields $$r(n+1) - (1-\alpha)r(n) = \alpha T - \alpha \epsilon(n) + p(n), \quad (10)$$

which is the desired system difference equation. The system difference equation (10) has constant coefficients and forcing function $\alpha T - \alpha \epsilon(n) + p(n)$. Thus, the process output at instant (n+1) is equal to the sum of the process output at the previous sampling instant n, the adjustment just made, and the net effect of all perturbations caused by factors external to the system which occurred during the period $n \cdot t_m \leq t < (n+1) \cdot t_m$. Consistent with the present invention, the generalized discrete control model described by equations (8)–(10) will be used below to model the flow control problem.

Stability Analysis of the Control System Model

Because a provably stable flow control methodology is desired, the stability of the discrete control model described will be addressed. The system difference equation for this controller is given by equation (10). To analyze the effects of the perturbations p (n), T and $\epsilon$(n) can be set to 0 with no loss of generality. Thus, equation (10) becomes $$r(n+1)-(1-\alpha)r(n)=p(n) \qquad (11)$$

Solution of equation (11) by a known method such as variation of parameters or the z transform yields $$r(n) = r(0)(1-\alpha)^n + \sum_{i=0}^{n-1} p(i)(1-\alpha)^{n-1-i}. \qquad (12)$$

For further simplification, r (0) can be assumed to be zero, so equation (12) becomes simply $$r(n) = \sum_{i=0}^{n-1} p(i)(1-\alpha)^{n-1-i} \qquad (13)$$

or, alternatively, $$r(n) = \sum_{i=0}^{n-1} p(n-1-i)(1-\alpha)^i. \qquad (14)$$

To consider the stability of this system, each individual p (n) can be written $$p(n) = p(n)\delta(n-i) = \begin{cases} p(n) & \text{for } i = n \\ 0 & \text{elsewhere} \end{cases} \qquad (15)$$

That is, each p (n) is an impulse with magnitude p (n) occurring at time n. Since stability is based on the impulse response, r (n) as given by equation (13) is simply the sum of the sequence of impulses p (i), i=0, ..., n−1, each one multiplied by a power of (1−α). Moreover, the exponent of the coefficient of p (i) is an increasing function of n. Thus, if this controller is to effectively eliminate the effects of these perturbations as n increases without bound, the coefficient of each p (i) must decrease in magnitude with increasing n. For this to occur, $$|{-\alpha}|<1 \qquad (16)$$

or $$0<\alpha<2. \qquad (17)$$

Therefore, for the controller to be stable, the proportionality constant α must satisfy equation (17). Inequality (17) defines what is referred to as the "stability range" of α. Values of α below zero or above 2 cause the effects of the p (i) to increase with increasing n, the condition referred to as "instability." The special case of α=0 and α=2 result in perpetuating the effects of a given p (i) with constant magnitude. This situation is often referred to as "marginal stability," although many authors simply class all systems which are not actually stable as unstable. For α<1 the effect of the perturbation has the same sign for all n, (i.e., r (n) has positive values only), whereas for α>1, the sign of the perturbation effect alternates with increasing n. Also, the effects of p (0) are more rapidly eliminated as |α|→1. Thus, if r (n) takes on only positive values, then the stability range of α is 0<α<1, which is the stability range of interest here.

Flow Control Using a Linear Feedback Control Model

With the application of the basic control model described above, the ABR flow control process in a network can be modeled as an adaptive control system consistent with the present invention. Two major advantages of this approach are: (1) the process can utilize various adaptive control policies, whose steady state, stability and responsiveness properties can be rigorously analyzed using control theoretical techniques; and (2) the control model fits well into the distributed environment, because various system adaptive mechanisms, such as buffer smoothing and filtering, can be associated with policies in the adaptive controllers.

For a simple scenario in which a single source transmits data to a bottlenecked node, let r (n) be the fair rate allocation arriving at a source at time n. For a persistent source (i.e., a source that always has data to transmit) that is also rate compliant, r (n) is assumed to be the actual load arriving at the network node. Let M(n) be the estimate of the ABR traffic load on the network node derived from sample measurements. $t_m$ is the sampling interval, which is the time elapsed in the interval [n, n+1], where n are time instants. Let T be the target arrival load desired at the network node.

The rate controller at the network node regulates the source's traffic rate to the network in proportion to the difference between the estimated traffic rate and the desired load level by using explicit rate control signals, such as the ER field in RM cells. The evolution of the system through time is described by the following equation (for a system in which the only delay is due to the sampling delay $t_m$), $$r(n+1)=r(n)+\alpha[T-M(n)]. \qquad (18)$$

In practice, the traffic load is never negative. However, r (n) could become negative in equation (18), so in the implementation of control algorithms, the r (n) values are bounded to realistic values as indicated in equation (19), where $T_{Max}$ is an upper bound on r (n+1):

$$r(n+1) = [r(n) + \alpha[T - M(n)]]_0^{T^{\max}}. \qquad (19)$$

These bounds should not invalidate the conclusions about stability described below. Note that, similar to the control model shown in FIG. 4B, the load estimate M (n) is derived from sample measurements, i.e., M (n)=r (n)+ε(n), where r (n) is assumed to be the actual load and ε (n) is a noise or error term which arises from the measurement process. Also, perturbations to the system are considered as noise and are thus included in ε (n).

The control model in equation (18) concentrates on one single source in the flow control process. For N sources transmitting data to the bottlenecked node, equation (18) can be written as $$r(n+1) = r(n) + \alpha\left[\frac{T-M(n)}{N}\right], \qquad (20)$$

where the N sources share the effort in reducing the rate mismatch between T and M. Equation (20) gives the following per-source rate control model $$r(n+1)=r(n)+\alpha[T'-M'(n)], \qquad (21)$$

where T'=T/N is an equivalent per-source target load and M' (n)=M (n)/N is an equivalent per-source estimated traffic load.

In this control model, a rate mismatch due to the activation or deactivation of a number of sources will produce the necessary error term e (n)=[T−M (n)], which can then be used to determine the correct fair rate allocation to the sources. Intuitively, the above control model also achieves max-min fairness as defined in TM4.0. If a source suddenly increases its activity, the measured ABR traffic rate M (n) will rise, giving a negative error e (n)=[T−M (n)] and resulting in a reduction in the next effective fair share r (n+1); similarly, if a source suddenly decreases its activity, the next effective fair share will be increased.

Consistent with the present invention, the control model can be extended to account for feedback control delays. These include the time lag after which the control decisions (i.e., rate allocations) made by the bottlenecked node eventually take effect at the bottlenecked node. Let d be the time interval (in units of $t_m$) it takes for a control decision (i.e., a fair rate allocation) sent by the bottlenecked node to the data source to take effect at the bottlenecked node. If RTT is the round-trip time (in units of $t_m$) from the source to destination and back, then d<RTT and depends on the location of the bottlenecked node relative to the source. The extreme case is d=RTT, where the destination is directly attached to the bottlenecked node.

For a single source transmitting data to the bottlenecked node, the system difference equation for a proportional controller with a feedback delay of d time intervals is $$r(n+1)-r(n)+\alpha r(n-d)=\alpha T-\alpha \epsilon(n-d) \quad (22)$$

or $$r(n+d+1)-r(n+d)+\alpha r(n)=\alpha T-\alpha \epsilon(n). \quad (23)$$

Stability Analysis of the Flow Control Model

The stability of the flow control model presented by equations (22) and (23) will now be addressed. The concept of stability has a two-fold meaning. First, in an environment of multiple sources simultaneously sharing a limited availability of resources, the aggregate of adaptation activities by all sources needs to be stable. That is, when the number of active sources is fixed, system resources allocated to each source must settle down to a steady state within a definite period of time. This definition of stability also implies that, if a new source becomes active, existing active sources will adjust their resource usage so that, after a brief transient period, the system settles down to a new steady state. A second type of stability implies that, in response to variations in resource availability due to unpredictable and physical causes, adaptation activities do not suffer from oscillations, which are undesirable because they cause both fluctuations in user-perceptible qualities, and an excessive amount of adaptation attempts that may occupy too many resources and overload the system. Thus, stability requires that the system converge to steady state in the presence of disturbances and statistical multiplexing.

Stability of the flow control process can be determined by analyzing the (d+1)th order difference equation (23) with constant real coefficients. Stability analysis for a system consistent with the present invention that has feedback delay is more complex than the stability analysis of the delayless system in equation (10). It is desirable to use a stability test that can be applied directly to the characteristic equation in the polynomial form given in equation (23) and provide solutions in the form of functions of system parameters so that stable ranges can be determined. A number of stability tests are available which require as input information only the polynomial form of the system difference equation or the polynomial form of the z transform of the system response. The Routh-Hurwitz test is one such stability test that can be applied to equation (23) for fixed values of d and α. Details of the Routh-Hurwitz can be found in many standard textbooks on control systems, including DiStefano, J. J., A. R. Stubberud, and I. J. Williams, *Feedback and Control Systems,* Schaum's Outline Series, McGraw-Hill, New York, 1990, which is incorporated herein by reference. Application of the test will determine the relationship between d and α that guarantees the stability of the r(n) process.

For noise-free operation (i.e., $\epsilon$ (n)=0 for all n), the Routh-Hurwitz test can be applied directly to equation (23). The stability of the flow control problem is determined by analyzing the roots of the denominator ($F_d(z)$) of the z-transform $$F(z) = \sum_{n=o}^{\infty} r(n)z^n.$$

The denominator $F_d(z)$ is given by the polynomial equation $$F_d(z)=z^{d+1}-z^d+\alpha, 0<\alpha<1 \quad (24)$$

The system is stable if the roots of $F_d(z)=0$ lie inside the unit circle in z space. According to theorems of digital control theory, in order for the system to be stable, all roots of the characteristic equation need to be within the stability boundary, which is the unit circle. In other words, for any root z, $|z|$ must be less than 1. The location of these roots relative to the unit circle can be determined by using a bilinear transform and then applying the Routh-Hurwitz test. Alternatively, the stability of a linear discrete-time system expressed in the z-domain, such as that in equation (24), can be determined using the s-plane methods developed for continuous systems (e.g., Routh-Hurwitz). The bilinear transformation of the complex variable z into the new complex variable h given by the expression $$h = \frac{z+1}{z-1}$$

transforms the interior of the unit circle in the z-plane onto the left half of the h-plane. Therefore, the stability of a discrete-time system with characteristic polynomial $F_d(z)$ can be determined by examining the locations of the roots of $$\hat{F}_d(h)=F_d(z)|_{z=(h+1)/(h-1)}=0 \quad (25)$$

in the h-plane, treating h like s and using s-plane techniques, such as Routh-Hurwitz, to establish stability properties. The bilinear transformation results in the relation $$\hat{F}_d(h)=(h+1)^{d+1}-(h+1)^d(h-1)+\alpha(h-1)^{d+1}=0. \quad (26)$$

The roots of this polynomial equation must lie in the left-half h-plane for stability. Expanding and grouping like powers of h gives $$\hat{F}_d(h) = \sum_{k=0}^{d+1} \frac{d!}{k!(d+1-k)!} [2k+(-1)^k(d+1)\alpha]h^{d+1-k} \quad (27)$$

The Routh-Hurwitz test is performed on arrays of numbers generated by the coefficients of the polynomial equation $$\hat{F}_d(h)=c_0h^{d+1}+c_1h^d+\ldots+c_dh+c_{d+1}=0. \quad (28)$$

The entries for the first two rows of the Routh-Hurwitz array are, therefore, given by $$G_k=2k+(-1)^k(d+1)\alpha \quad (29)$$

The entries in the first two rows of the Routh-Hurwitz array for equation (27) are $$G_0 = \alpha \qquad (30)$$

and $$G_1 = 2 - (d+1)\alpha \qquad (31)$$

For stability, both $G_0$ and $G_1$ must be of the same sign. Therefore, since $\alpha > 0$ and $d > 0$, the condition on $G_1$ requires that $$0 < 2 - (d+1)\alpha$$

or $$\alpha < \frac{2}{d+1}. \qquad (32)$$

For $\alpha < 0$, however, $G_1 < 0$ requires that $\alpha > 2/(d+1) > 0$, which is impossible for negative $\alpha$. This confirms the nonnegativity of $\alpha$ and also indicates that the leading entries of all rows in the Routh-Hurwitz array must be positive. Thus, equation (32) is the desired relationship between $\alpha$ and $d$ that is required for a flow control process consistent with the present invention to be stable.

For multiple sources with different feedback delays, $d_1 < d_2 < \ldots < d_N$, setting $\alpha < 2/(d_N+1)$ ensures fairness and global stability of a flow control process consistent with the present invention, since $$\frac{2}{d_N + 1} < \frac{2}{d_{N-1} + 1} < \frac{2}{d_1 + 1}. \qquad (33)$$

Thus, the value of $\alpha$ used in a flow control method consistent with the present invention should be $$\alpha < \frac{2}{d+1}, \quad d = \max(d_1, d_2, \ldots, d_N). \qquad (34)$$

Consistent with the present invention, the value of d can be derived from the parameter FRTT (fixed round-trip time), a parameter determined during establishment of an ABR connection. Thus, for N connections through the bottlenecked node, $$d = \left\lceil \frac{maxFRTT}{t_m} \right\rceil, \quad maxFRTT = \max(FRTT_1, \ldots, FRTT_N). \qquad (35)$$

The stability constraint given by equation (32) is necessary but may not be sufficient for all values of d because the Routh-Hurwitz test for sign change should be made on all rows of the test array, not just the first two rows. However, for the case of d=1 (already analyzed above in equations (11)–(17) with respect to the control system model), the stability limit was found to be $\alpha < 1$. It is seen in this case that (32) is sufficient to insure stability for noise-free operation.

The stability analysis presented above assumes a noise-free environment (i.e., $\epsilon(n)=0$). To account for system noise and disturbances that might be encountered during the flow control process, the value of $\alpha$ to be used in a flow control method consistent with the present invention is $$\alpha = \frac{1}{d+1} \qquad (36)$$

which is well within the stability bound stated in equation (32).

In addition to being stable, it is also desirable that the system respond quickly to changes in both resource availability and service requirements of the sources. From the point of view of the control process, responsiveness is determined by configurable parameters. In a flow control method consistent with the present invention, the parameter $\alpha$ is configurable as long as the stability conditions are maintained. Several parameters affecting responsiveness are configurable at the source end, e.g., RIF. The dynamics of the system are affected significantly by different configurations of $\alpha$. When $\alpha$ is large, the system reaches steady state much faster but shows more oscillating transients. For a smaller $\alpha$, the system reaches steady state more slowly but has smaller oscillating transients. Overall, the algorithm is configurable according to the needs of the system.

Flow Control Method

Figure 5:
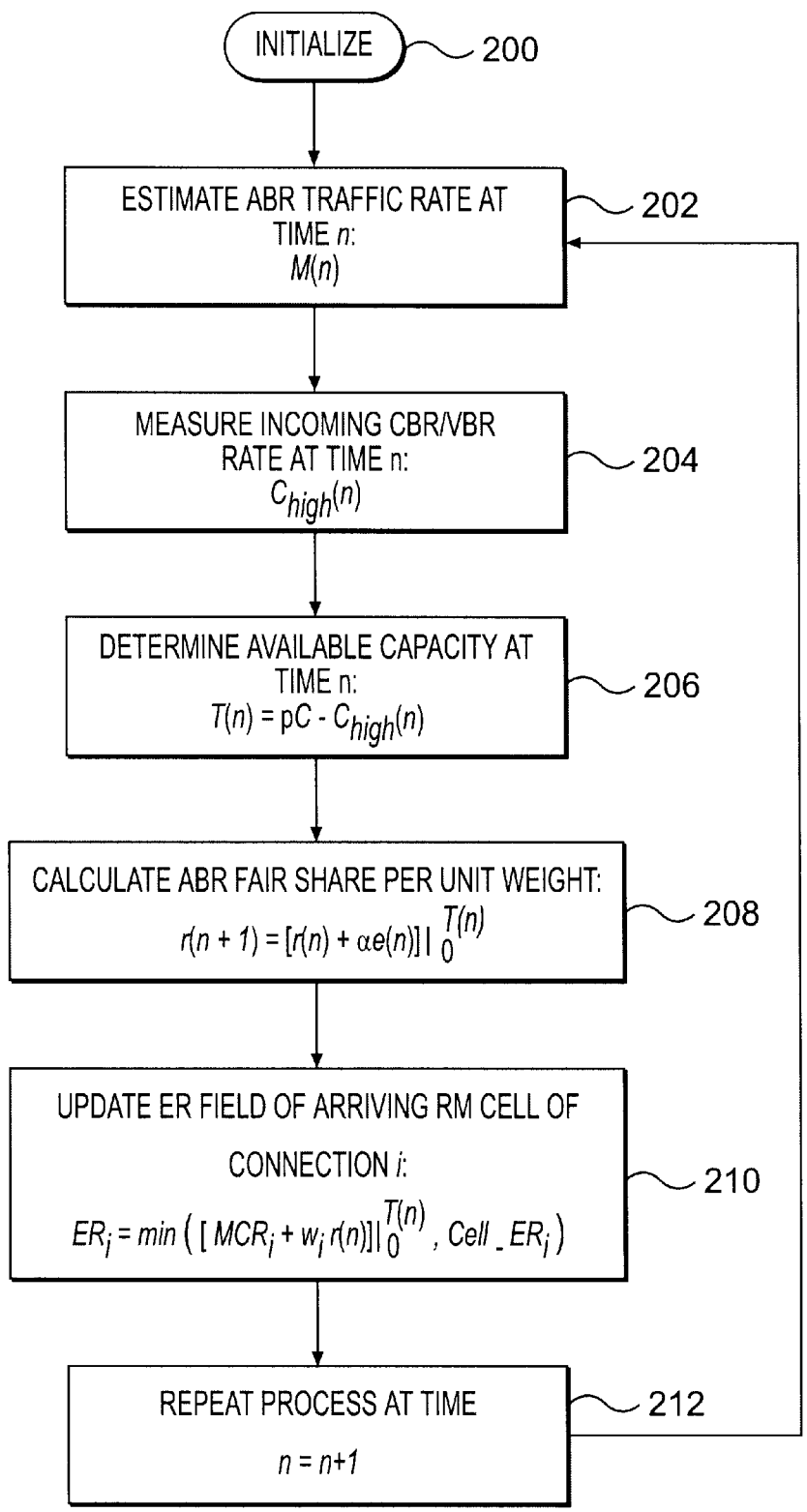
FIG. 5 is a flowchart of a flow control method consistent with the present invention.

FIG. 5 illustrates a method of flow control consistent with the present invention in which the network is modeled using the feedback control model described above. Generally, a method consistent with the present invention periodically determines the aggregate ABR and CBR/VBR traffic rates at a switch, estimates the available capacity of an outgoing link, calculates an ABR fair share rate, and uses this fair share rate to update the ER fields of arriving RM cells. The ER fields of FRM or BRM cells can be updated, but for fast system response, only BRM cells are updated. The incoming traffic rates are sampled during a time interval n, and the fair share rate is computed at the end of the time interval. Time intervals are of length $t_m$. A method consistent with the present invention may operate within rate controller 126 in switch 106, shown in FIG. 2. Consistent with the present invention, rate controller 126 may be implemented as software stored in a memory in the switch and executed by a processor in the switch. The memory may be any type of computer-readable medium, such as any electronic, magnetic, or optical read/write storage device.

At the beginning of the first time interval n=1 (i.e., the interval [0,1)), or at time=0, the process is initialized (step 200). For example, the initial ABR rate M(0) is set to zero. The initial CBR/VBR rate $C_{high}(0)$ is set to a known value. The available capacity T(0) is computed as:

$$T(0) = pC - C_{high}(0), \qquad (37)$$

where p is the desired link utilization factor and C is the link capacity.

The initial fair share rate r (1) is determined as:

$$r(1) = \frac{T(0) - M(0)}{w_T(0)} = \frac{pC - C_{high}(0)}{w_T(0)} \qquad (38)$$

where each ABR source i has a static weight of $w_{i,}(n)$ showing its relative priority or importance compared to other sources, and $w_T(n) = \Sigma_i w_i(n)$ is the sum of the weights of all ABR sources. The weights $w_{i,}(n)$ will be used in allocating the fair share rate to the sources based on their relative importance. In the simple case, each source is weighted equally with weight $w_i=1$, and $w_T=N$, the total number of ABR connections. Calculation of $w_T$ consistent with the present invention will be presented below.

After initialization, a flow control method consistent with the present invention estimates the ABR traffic rate M(n) at the end of each time interval n (n=1, 2, 3, . . . ) (step 202). For n≧1, M(n) is estimated by sampling the ABR traffic over the time interval. The background CBR/VBR traffic rate $C_{high}(n)$ is also estimated at the end of each time interval n (step 204). Performance can be improved by filtering the CBR/VBR traffic to remove the high-frequency fluctuations that may be present in the VBR traffic. Filtering improves stability and reduces oscillations by removing the high-frequency fluctuations. Filtering can be performed by a moving average (MA) filter, an exponentially weighted moving average (EWMA) filter, or any other suitable filtering technique.

Next, the available capacity T(n) at time n is determined based on the estimated CBR/VBR traffic rate $C_{high}$ (n), the link capacity C, and the link utilization factor p (step 206):

$$T(n)=pC-C_{high}(n), \qquad (39)$$

The fair share per unit weight is then calculated based on the estimated ABR traffic and the available capacity of the link using the provably stable proportional control model described above. The fair share r (n+1) calculated at the end of the time interval n will be available throughout the next time interval n+1 for updating the ER field of RM cells arriving at the switch. The fair share is calculated according to:

$$r(n+1) = [r(n) + \alpha e(n)]_0^{T(n)} \qquad (40)$$

where $$\alpha = \frac{1}{d+1} \qquad (41)$$

and $$e(n) = \frac{T(n) - M(n)}{w_T(n)} \qquad (42)$$

The upper bound $T_{max}$, as defined in equation (19), is bounded to $T_{max}=T(n)=pC-C_{high}(n)$. This allows an ABR source to grab all the unused available capacity when other sources become inactive or are not using their MCR. The delay d is defined as $$d = \left\lceil \frac{maxFRTT}{t_m} \right\rceil, \quad maxFRTT = \max(FRTT_1, \ldots, FRTT_N). \qquad (43)$$

FRTT is a parameter signaled during setup of an ABR connection and remains unchanged during the lifetime of the connection. FRTT is the sum of the fixed RM cell processing delays and propagation delays from the source to a destination and back.

During the next time interval, the fair share rate calculated in step 208 is used to update the ER field of arriving RM cells on connection i (step 210):

$$ER_i=\min([MCR_i+w_i r(n)]^{T(n)}_0, \text{Cell\_}ER_i) \qquad (44)$$

where Cell_$ER_i$ is the actual value of the RM cell's ER field.

The process continues for each time interval. At the beginning of each time interval (step 212), the process begins sampling ABR traffic and CBR/VBR traffic to estimate traffic rates to be used at the end of the time interval (steps 202 and 204).

Figure 6:
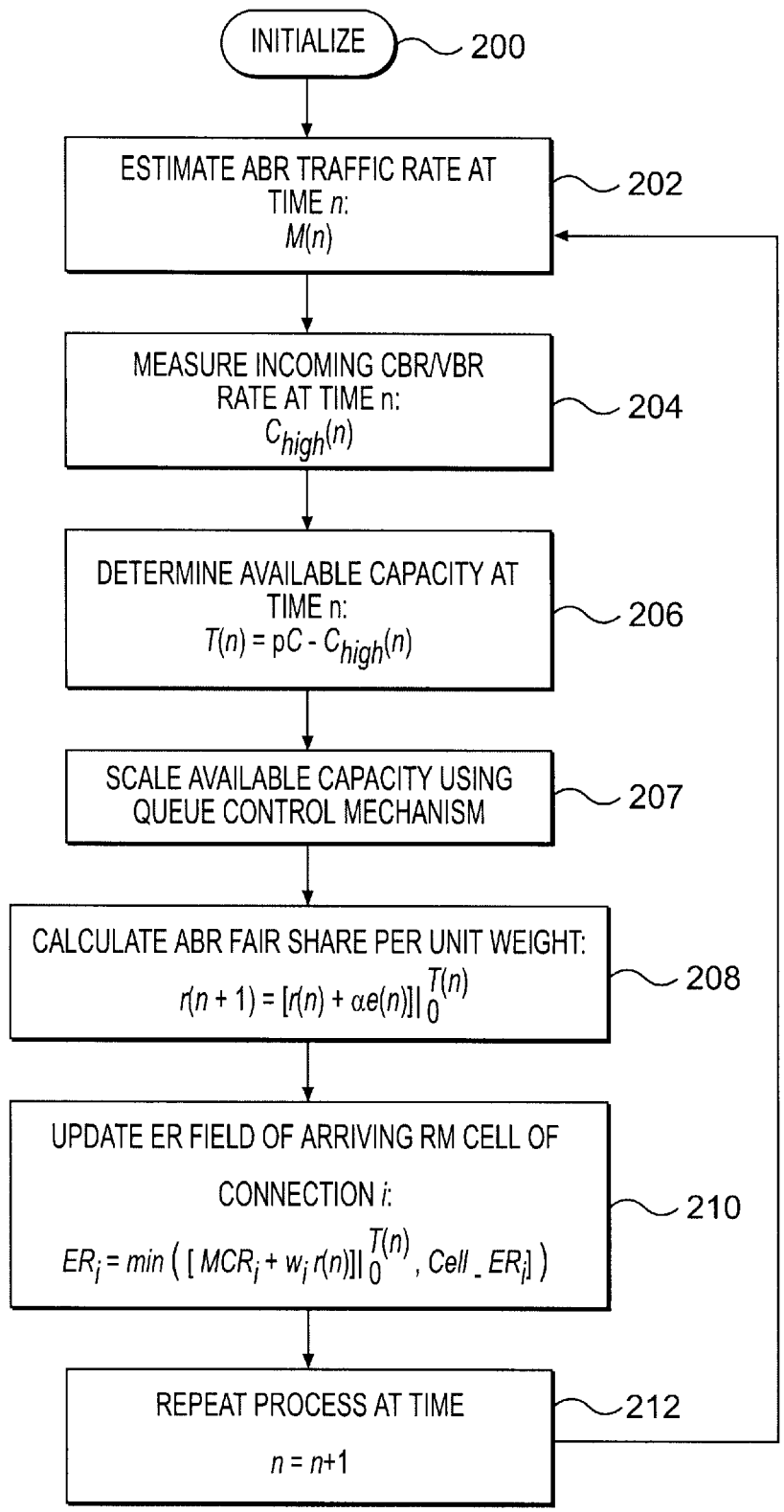
FIG. 6 is a flowchart of another flow control method consistent with the present invention.

FIG. 6 shows another method consistent with the present invention in which an optional queue size control mechanism is added to the flow control method in FIG. 5. In step 207, the available capacity T(n) is scaled down when the queue size exceeds a threshold value $T_h$. Adding this control mechanism to the flow control process helps to control queue length effectively to minimize cell loss and to minimize network delays. A queue size control mechanism consistent with the present invention is triggered when the number of ABR cells q(n) in an output port ABR queue at time interval n exceeds a queue threshold $T_h$. When this occurs, the available ABR rate T(n) is scaled down by a function f(n) of the current queue size q(n):

$$T(n) <= f(n) \cdot T(n) \qquad (45)$$

Figure 7B:
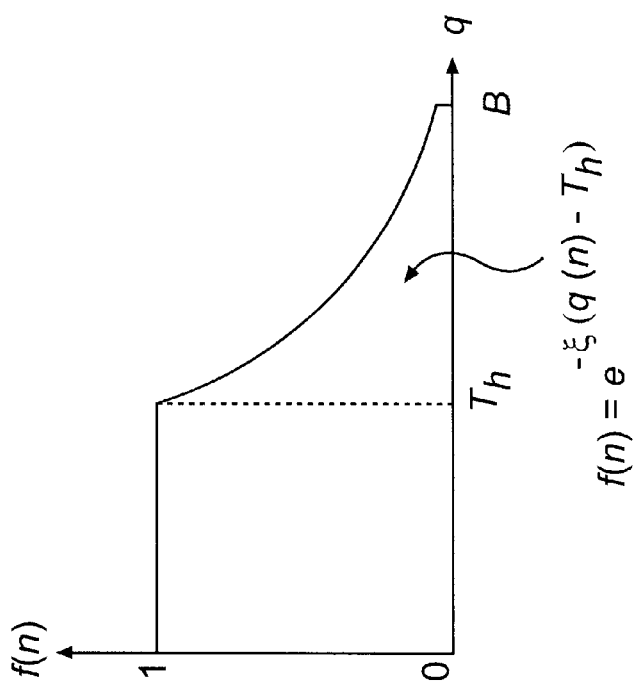
FIGS. 7A–B illustrate scaling functions to be used in the method of FIG. 6.
Figure 7A:
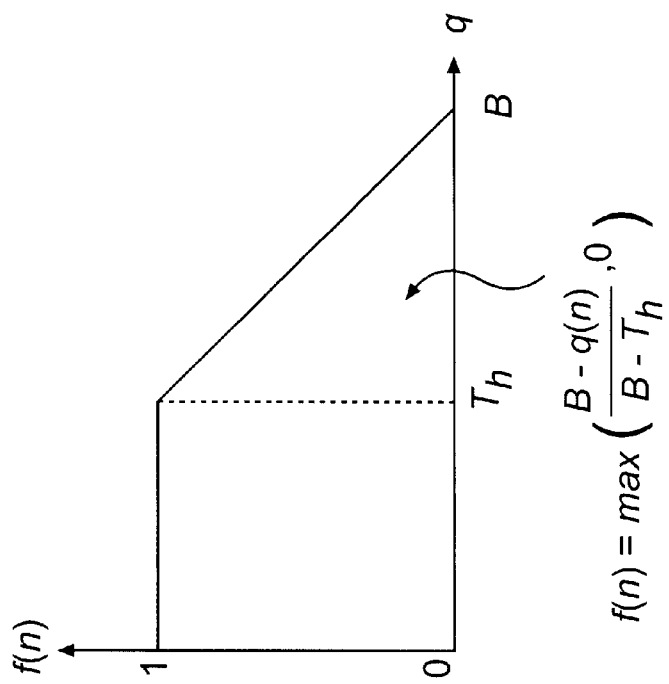

The extra capacity (1−f (n))·T(n) is used to drain the queue down to a normal operating point. FIGS. 7A–B show two possible functions f(n) based on the instantaneous queue size q(n), the allocated ABR buffer size B, and the queue threshold $T_h$. FIG. 7A shows the function $$f(n) = \max\left(\frac{B - q(n)}{B - T_h}, 0\right) \qquad (46)$$

FIG. 7B shows the function when $0 < q(n) - T_h < B$ then $f(n) = e^{-\xi(q(n)-T_h)}$ when $q(n) - T_h > B$ then $f(n) = 0$ $\qquad (47)$ where ξ is a decay factor of the queue control function.

Figure 8:
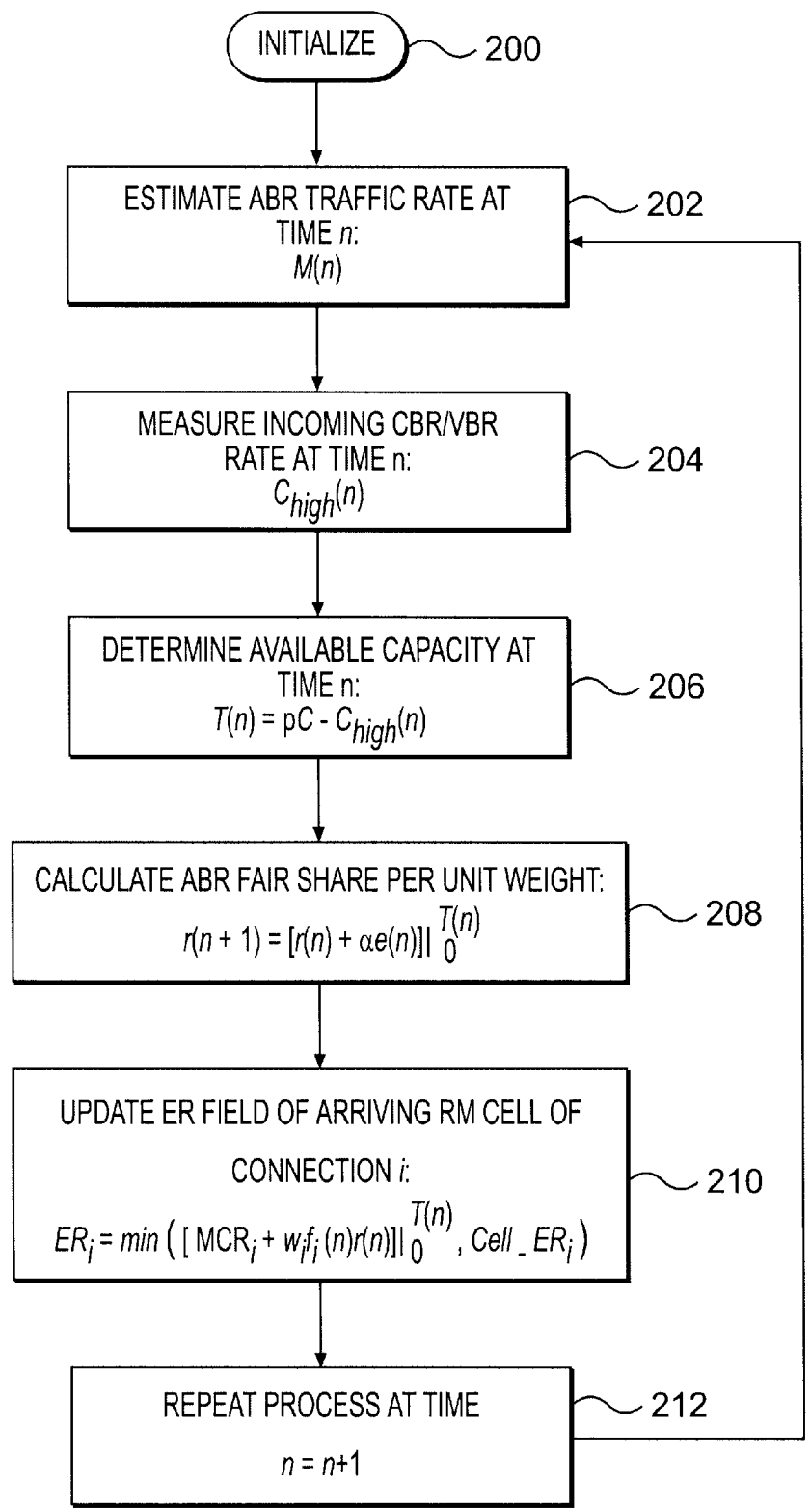
FIG. 8 is a flowchart of yet another flow control method consistent with the present invention.

FIG. 8 shows another method consistent with the present invention with a different optional queue size control mechanism added to the flow control method in FIG. 5. In this method, the switch operates per-connection queueing. Thus, there is a separate queue for each ABR connection i. The scaling function f(n) can be applied on a per-queue basis to reduce the fair rate available only for the individual queues whose length exceeds a queue threshold. The per-connection queue control function $f_i(n)$ is a function of the per-connection queue size $q_i(n)$, the per-connection queue threshold $T_{h,i}$, and the per-connection buffer allocation $B_i$. Any scaling function may be used, such as those shown in FIGS. 7A–B.

The per-connection scaling function is used in step 210 of FIG. 8 to scale down the fair share to be allocated to connections whose queue exceed their threshold. That is, the ER field of passing RM cells for connection i is set to $$ER_i=\min([MCR_i+w_i f_i(n) r(n)]^{T(n)}_0, \text{Cell\_}ER_i) \qquad (48)$$

Dynamic Tracking of the Effective Number of Active Connections (or Weights)

As described in connection with equations (38) and (42), the sum of the weights of all ABR sources, $w_T$, is used to determine a fair share rate consistent with the present invention. Dynamically changing the parameter $w_T$, which represents the effective number of active connections (or weights), can improve the responsiveness of the system, especially when there are a large number of connections that have been setup but are not necessarily active. For example, if the number of connections is 8000, but 1% or less are active at a given time, setting $w_T$ to the number of provisioned connections (N=8000) will slow the response of flow control consistent with the present invention. Dynamically changing $w_T$ improves system response and resource utilization.

Bottlenecked connections are defined to be connection which are unable to achieve their fair share of bandwidth at the given link because of constraints imposed by their PCR requirements or, most likely, by limited bandwidth available at other links. Non-bottlenecked connections are defined to be connections whose achievable bandwidth is only limited at the given link.

The max-min criterion attempts to equally allocate the available bandwidth among all connections bottlenecked at a link. This principle is fair since all connections that share a link obtain an equal share of link bandwidth provided they can use that fair share, and the only factor preventing a connection from obtaining higher allocation is its bottleneck link. Moreover, this principle is efficient in that it maximizes the throughput for all connections that have the minimum allocation in the network.

The fair share can be written as:

$$\text{Fair Share} = \frac{\text{ABR Capacity} - \sum_{\text{bottlenecked elsewhere}}^{\text{Rates of connections}}}{N - \sum \text{Connections bottlenecked elsewhere}} \quad (49)$$

$$= \frac{T - \sum_{i=1}^{N_b} R_{b,i}}{N - N_b}$$

where N=the total number of connections setup in the link. Denoting the number of non-bottlenecked connections as $N_{nb}=N-N_b$, equation (49) can be written as $$\text{Fair Share} = \frac{T - \sum_{i=1}^{N_b} R_{b,i}}{N_{nb}}. \quad (50)$$

This can be rewritten as $$\text{Fair Share} \cdot N_{nb} + \sum_{i=1}^{N_b} R_{b,i} = T \quad (51)$$

or $$\text{Fair Share} \cdot \left(N_{nb} + \sum_{i=1}^{N_b} \frac{R_{b,i}}{\text{Fair Share}}\right) = T. \quad (52)$$

Thus, $$\text{Fair Share} = \frac{T}{N_{nb} + \sum_{i=1}^{N_b} \frac{R_{b,i}}{\text{Fair Share}}} = \frac{T}{N_{\text{eff}}} \quad (53)$$

where $$N_{\text{eff}} = N_{nb} + \sum_{i=1}^{N_b} \frac{R_{b,i}}{\text{Fair Share}}. \quad (54)$$

This shows that the effective number of active connections $N_{\text{eff}}$ is equal to the number of non-bottlenecked connections plus the fractional activity of the bottlenecked connections. This derivation generalizes to the case of per-connection weights (i. e., when each connection has a weight greater than or equal to 1).

Thus the effective number of active connections $N_{\text{eff}}$ can be written in terms of the ABR capacity T and the fair share rate:

$$N_{\text{eff}} = \frac{T}{\text{Fair Share}}. \quad (55)$$

Another estimate of the effective number of active connections can be made based on the measured aggregate ABR traffic rate M:

$$N_{\text{eff}} = \frac{M}{\text{Fair Share}}. \quad (56)$$

In steady state, the values determined by the two approaches converge to the same value.

Consistent with the present invention, the effective number of connections or weights can be based on either T or M or a combination of the two schemes as follows:

$$N_{\text{eff}} = \max\left(\frac{M}{\text{Fair Share}}, \frac{T}{\text{Fair Share}}\right). \quad (57)$$

Equation (57) assumes the sources have MCRs equal to zero. For non-zero MCRs, $$N_{\text{eff}} = \max\left(\frac{M^*}{\text{Fair Share}}, \frac{T^*}{\text{Fair Share}}\right), \quad (58)$$

where $$M^* = \max\left(0, M - \sum_{i=1}^{N} MCR_i\right) \quad (59)$$

and $$T^* = \max\left(0, T - \sum_{i=1}^{N} MCR_i\right). \quad (60)$$

Consistent with the present invention, the number of effective weights is determined based on the above equations as:

$$w_{\text{eff}}(n) = \min\left(\max\left(1, \frac{M^*(n)}{r(n)}, \frac{T^*(n)}{r(n)}\right), W_{\text{total}}\right), \quad (61)$$

where $$W_{\text{total}} = \sum_{i=1}^{N} w_i$$

is the sum of all weights of all established connections, and M* and T* are defined according to equations (59) and (60).

The value of $w_T(n)$ to be used in equations (38) and (42) in methods consistent with the present invention can be obtained as the instantaneous or filtered value of $w_{\text{eff}}(n)$. Filtering can be done using a moving average, exponential weighted moving average, or any suitable filtering technique.

It will be appreciated by those skilled in this art that various modifications and variations can be made to the flow control mechanism consistent with the present invention described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. A method of flow control in a network including a network switch connected to an outgoing link with a maximum link capacity, the network switch receiving data packets and management packets having a plurality of source-destination connections passing through the network switch, the method comprising:

determining a current error value based at least in part on an aggregate arrival rate of the data packets from the plurality of connections and a desired rate;

scaling the current error value using a scaling factor that is a function of maximum round-trip delay among all connections;

determining a fair share rate for the data packets on each of the plurality of connections based on a summation of said scaled current error value and a previously determined fair share rate value; and determining a new target rate for data packets on at least one of the plurality of connections based on said determined fair share rate.

2. The method of claim 1 wherein each connection is assigned a weight, wherein the step of determining a fair share rate further comprises the step of utilizing the weights of the plurality of active connections in a further scaling of the previously scaled current error; and wherein the step of determining a new target rate further comprises the step of utilizing the assigned weight of the connection.

3. The method of claim 2 wherein the step of determining the weights of the plurality of active connections further comprises the step of utilizing the ratio of an aggregate arrival rate and a current fair share rate.

4. The method of claim 2 wherein the step of determining the weights of the plurality of active connections further comprises the step of utilizing the ratio of a desired rate and a current fair share rate.

5. The method of claim 1 wherein the step of determining a fair share rate further comprises the step of utilizing the effective number of active connections in a further scaling of the previously scaled current error.

6. The method of claim 5 wherein the step of determining an effective number of active connections further comprises the step of utilizing the ratio of an aggregate arrival rate and a current fair share rate.

7. The method of claim 5 wherein the step of determining an effective number of active connections further comprises the step of utilizing the ratio of a desired rate and a current fair share rate.

8. A network switch for controlling flow in a network switch, the network switch connected to an outgoing link with a maximum link capacity and receiving data packets and management packets having a plurality of source-destination connections passing through the network switch, the network switch comprising:

means for determining a current error value based at least in part on an aggregate arrival rate of the data packets from the plurality of connections and a desired rate;

means for scaling the current error value using a scaling factor that is a function of maximum round-trip delay among all connections; and a rate controller module including means for determining a fair share rate for the data packets on each of the plurality of connections based on a summation of said scaled current error value and a previously determined fair share rate value; and means for determining a target rate for the data packets on at least one of the plurality of connections based on said determined fair share rate.

9. The network switch of claim 8 wherein each connection is assigned a weight, wherein the means for determining a fair share rate further comprises means for utilizing the weights of the plurality of active connections in a further scaling of the previously scaled current error; and wherein the means for determining a new target rate further comprises means for utilizing the assigned weight of the connection.

10. The network switch of claim 9 wherein the means for determining the weights of the plurality of active connections further comprises means for utilizing the ratio of an aggregate arrival rate and a current fair share rate.

11. The network switch of claim 9 wherein the means for determining the weights of the plurality of active connections further comprises means for utilizing the ratio of a desired rate and a current fair share rate.

12. The network switch of claim 8 wherein the means for determining a fair share rate further comprises means for utilizing the effective number of active connections in a further scaling of the previously scaled current error.

13. The network switch of claim 12 wherein the means for determining an effective number of active connections further comprises means for utilizing the ratio of an aggregate arrival rate and a current fair share rate.

14. The network switch of claim 12 wherein the means for determining an effective number of active connections further comprises the means for utilizing the ratio of a desired rate and a current fair share rate.

15. A communication network comprising:

a plurality of sources;

a plurality of destinations;

a plurality of network switches, each connected to an outgoing link with a maximum link capacity and receiving data packets and management packets having a plurality of source-destination connections passing through the network switch, each network switch comprising:

means for determining a current error value based at least in part on an aggregate arrival rate of the data packets from the plurality of connections and a desired rate;

means for scaling the current error value using a scaling factor that is a function of maximum round-trip delay among all connections; and a rate controller module including means for determining a fair share rate for the data packets on each of the plurality of connections based on a summation of said scaled current error value and a previously determined fair share rate value; and means for determining a target rate for the data packets on at least one of the plurality of connections based on said determined fair share rate.

* * * * *

UNITED STATES PATENT AND TRADEMARK OFFICE
CERTIFICATE OF CORRECTION

PATENT NO.     : 6,549,517 B1
DATED          : April 15, 2003
INVENTOR(S)    : James Aweya It is certified that error appears in the above-identified patent and that said Letters Patent is hereby corrected as shown below:

<u>Title page, Item [54] and Column 1, line 2,</u>
Change "COMPUTE" to -- COMPUTER --

Signed and Sealed this

Nineteenth Day of August, 2003

JAMES E. ROGAN
*Director of the United States Patent and Trademark Office*